United States Patent Office 3,826,666
Patented July 30, 1974

3,826,666
ENTERIC CAPSULES
Michihiro Hirai, Yokohama, and Toyokazu Shimizu, Sagamihara, Japan, assignors to Parke, Davis & Company, Detroit, Mich.
No Drawing. Filed July 20, 1972, Ser. No. 273,521
Int. Cl. A61k 9/04; C08b 21/08
U.S. Cl. 106—128                        5 Claims

ABSTRACT OF THE DISCLOSURE

Pharmaceutical capsules having enteric properties are formed from a homogeneous composition comprising gelatin and an alkali metal salt of hydroxypropyl methylcellulose phthalate, optionally with the inclusion of a plasticizer and/or a coloring agent. The capsules are soluble in or disintegrated by the alkaline intestinal secretions but are substantially insoluble or resistant to solution in the acid secretions of the stomach.

SUMMARY AND DETAILED DESCRIPTION

The present invention relates to enteric capsules. More particularly, the invention relates to pharmaceutical capsules having enteric properties and comprising gelatin and an alkali metal salt of hydroxypropyl methylcellulose phthalate, optionally in combination with other ingredients; and to methods for the production of such pharmaceutical capsules.

As used herein, the term "enteric properties" means the properties of being soluble in or disintegrated by the alkaline intestinal secretions but being substantially insoluble or resistant to solution in the acid secretions of the stomach. The term "enteric capsules" means capsules having enteric properties. The term "hydroxypropyl methylcellulose phthalate" means a cellulose derivative which, like cellulose itself, is a polymeric, high molecular weight substance; and which has the following structural unit

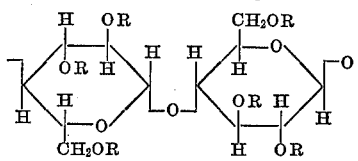

where R represents variously hydrogen, methyl, hydroxypropyl

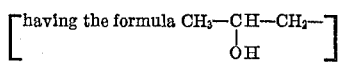

carboxybenzoyl

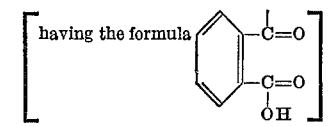

or 2-carboxybenzoyloxypropyl

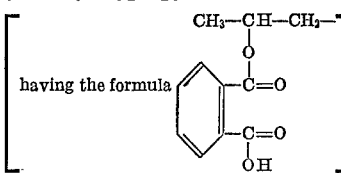

Hydroxypropyl methylcellulose phthalate is sometimes referred to herein as HPMCP.

For use in the invention, HPMCP typically has approximately 15–30% methoxyl content, 4–15% hydroxypropoxyl content, and 15–40% carboxybenzoyl content. HPMCP can be prepared according to any of a number of methods. At the present time, at least two grades or types of HPMCP are commercially available from the Shinetsu Chemical Company of Tokyo, Japan. These grades or types are known as HP-50 and HP-55. HP-50 is stated to have 20–25% methoxyl content, 8–12% hydroxypropoxyl content, and 20–27% carboxybenzoyl content. HP-55 is stated to have 18–22% methoxyl content, 6–10% hydroxypropoxyl content, and 27–35% carboxybenzoyl content. Both HP-50 and HP-55 are soluble in water by the addition of base. HP-50 is stated to dissolve at pH above 50.0 and HP-55 is stated to dissolve at pH above 5.5.

Ordinary pharmaceutical capsules made of gelatin do not have enteric properties and are therefore rapidly dissolved or disintegrated in the acid secretions of the stomach. There is, however, a need for pharmaceutical capsules having enteric properties. In many cases, medicinal substances are more readily utilized and are of greater therapeutic value if they are absorbed from the upper portion of the intestine. Medical science has long sought to provide efficient means for rendering such substances available for absorption from the intestinal tract. This problem arises from the fact that many medicinals are either not absorbed from the stomach or rapidly destroyed on contact with the acid present in the stomach. Some examples of medicinals of this type are gland products and penicillin. Many medicinals, such as hog bile, quinacrine, sulfa drugs, and the like, also are very unpleasant to take and cause severe gastric disturbances which may be coupled with very unpleasant regurgitation of the drug. Another use for enteric capsules is to prevent the breakdown or dilution of drugs which are used for their effect in the intestinal tract, such as intestinal antiseptics or anthelmintics. It is obvious that there is a great need for a practical method of administering medicinals of the above types in a form having enteric properties.

Many attempts have been made to provide suitable enteric capsules. Of the various techniques that have been employed, one that can be mentioned is the technique of forming a pharmaceutical capsule from a mixture of gelatin and an alkali metal salt of a cellulose derivative commonly known as cellulose acetate phthalate. Capsules made in this manner do in deed have enteric properties but, in addition, they have certain undesirable characteristics. Cellulose acetate phthalate is somewhat unstable and liberates acetic acid by hydrolysis. This causes the capsules to develop an odor and to become increasingly acidic. The increase in acidity exposes the contents of the capsule to an acidic environment which can be harmful to acid-sensitive medical ingredients. In addition, the increase in acidity can cause the capsule to become less soluble in the alkaline environment of the intestine.

It is an object of the present invention to provide an improved enteric capsule.

It is also an object of the invention to provide an enteric capsule having improved chemical stability and having little or no tendency to develop an odor or an increase in acidity.

It is a further object of the invention to provide improved enteric capsules suitable for filling on high speed filling machines.

It is still a further object of the invention to provide methods for manufacturing such improved enteric capsules.

These and other objects of the invention are achieved by producing enteric capsules from a mixture of gelatin and an alkali metal salt of HPMCP, optionally in combination with additional ingredients.

In manufacturing enteric capsules according to the invention, we first dissolve HPMCP in an aqueous solution of an alkali base to obtain an aqueous solution of the corresponding alkali metal salt of HPMCP. Some examples of the alkali bases which we may use for this purpose are sodium bicarbonate, sodium carbonate, potassium carbonate, sodium hydroxide, trisodium phosphate, and potassium hydroxide. In making this aqueous solution containing the salt of HPMCP we prefer to use just enough alkali to effect the solution of the ester, as any excess alkali present in the final solution tends to destroy or alter the gelatin. However, if desired, an excess of alkali may be used and the excess alkali present in the resultant solution neutralized with acid before adding the gelatin; or the solution may be heated until the pH falls to the proper value. The pH of the solution should preferably be on the acid side and about the same as that of the gelatin itself. The proper amount of alkali to use may be readily determined by a simple test on a small sample of HPMCP or it may be calculated if we know the percentage of free carboxyl group present in HPMCP.

We then add the aqueous gelatin solution to the aqueous solution containing the alkali metal salt of HPMCP. The mixture is then heated until a homogeneous viscous aqueous solution is obtained. Previously lubricated pins or molds are then immersed in the solution, withdrawn and the material on the pin set by cooling it at a temperature of less than about 18° C. The moisture is removed and the capsule part removed from the pin. The capsule part is then trimmed or cut and joined with the other portion of the capsule. The cooling feature of the process is an important step because the solution adhering to the pins or molds does not set as rapidly as gelatin itself, but tends to run and produce a capsule with uneven walls and weak shoulders. We have found that this cooling may be conveniently and rapidly accomplished by blowing cool air across the coated pins or molds. However, it should be understood that while this is a preferred method of cooling, the invention is not limited to this particular method.

We have found that the gelatin-HPMCP weight ratio is an important factor. This arises from the fact that a sufficient quantity of HPMCP (as salt) must be present in the finished capsule to render it insoluble in the stomach acid but the quantity must not be so great as to prevent the rapid dissolution of the capsule when it comes in contact with the alkaline secretions of the intestine. The amount of the HPMCP salt present in the final capsule is also limited by the fact that if too much is present, the capsule is brittle.

We have found that good results are obtained by using about 1.5-4 parts by weight of gelatin to 1 part by weight of HPMCP, measured as free acid form. In the case of HP-55, particularly valuable and effective enteric capsules are obtained by using about 2-2.5 parts by weight of gelatin to 1 part by weight of HP-55. The amount of water to be used in the preparation of the aqueous solution containing the gelatin and the HPMCP salt depends to a great extent on the wall thickness desired in the finished capsule. For instance, if a thin walled capsule is desired more water is used, whereas if a thick walled capsule is desired a more concentrated or viscous solution is used.

The wall thickness of the capsule is also dependent upon the temperature of the aqueous solution of gelatin and salt of HPMCP. This factor, however, is maintained fairly constant since an appreciable change in temperature is necessary in order to produce a small change in wall thickness and it is undesirable from a practical standpoint to vary the temperature over large ranges. Therefore, the gelatin-HPMCP salt solution in the dipping pan is kept at a fairly constant temperature between about 32 and 49° C. and preferably in the neighborhood of about 35-37° C.

If desired, a coloring agent or a plasticizer may be added to our new enteric capsules without destroying or substantially altering their valuable chemical and physical properties. The same kinds of coloring agents as used in the usual hard-shell capsules are suitable. Up to 5% (by weight of the dry gelatin) of a plasticizer, such as glycerine or propylene glycol, may be added if desired.

The new enteric capsules can be produced in any of the customary forms for pharmaceutical capsules. However, we prefer to make our new capsules in the form of conventional, hard-shell gelatin capsules comprising telescopically engaged body and cap portions, and having in addition one or more locking features.

The new enteric capsules of the invention have excellent enteric properties and pharmaceutical acceptability. They are chemically and physically stable and do not release acetic acid or develop significantly increased acidity during storage and use. In addition, they have a uniform wall thickness and a low percentage of manufacturing defects. Under comparable conditions, the percentage of accepted finished capsules produced according to this invention is 80-90% compared with 63% for enteric capsules produced from gelatin and cellulose acetate phthalate. The capsules of this invention have also been found suitable for use on a variety of filling machines including the PD-8 Type as well as the high speed Zanasi AZ-60R Type.

Although it is known in the prior art that HPMCP has enteric properties and can be used for the surface coating of pharmaceutical formulations such as tablets and granules, it is surprising that satisfactory pharmaceutical capsules can be manufactured by incorporating HPMCP throughout the capsule wall itself. This is because the commercial manufacture of pharmaceutical capsules is such a sensitive operation that it is adversely affected by almost any change in the conventional ingredients or operating conditions.

The invention is illustrated by the following example.

EXAMPLE

A finely divided mixture consisting of 2 kg. of sodium carbonate monohydrate and 14.5 kg. of HPMCP is added with stirring to 38 liters of water at 71° C. A material such as HP-55 is satisfactory. In order to reduce frothing of the mixture, a small amount of glycerol oleate (38 ml.) may be added. After solution is complete, the mixture is allowed to cool and stand overnight. The final pH of this solution is adjusted to $5.9 \pm 0.1$.

In a separate container 100 liters of pharmaceutical-grade gelatin solution (gelatin content: 34.24% by weight) is made in the usual way. This gelatin solution is added with rapid stirring to the sodium salt solution of HPMCP. Then the resultant solution is heated at 50-60° C. for 1 to 10 hours to ensure homogeneity of the solution. The homogeneous solution is placed in a dipping pan and maintained at a temperature of 34.4° C. and 36.7° C. respectively for the capsule body and cap pans. Previously lubricated pins or molds are dipped into the solution. The pins are withdrawn, and air at 15-16° C. is blown on the material adhering to the pins to set it. The capsule halves thus formed are dried with dehumidified air, trimmed, removed from the pins and joined together with the other halves of the capsule to form the finished hard-shell capsule.

If desired, HP-50 or another form of HPMCP can be used in the foregoing procedure. If colored capsules are desired, it is suitable to add 3,000 ml. of dye solution containing 3% by weight of a dye to the gelatin solution. In addition, up to 5% by weight of a plasticizer can be added if desired.

HPMCP suitable for use in the foregoing procedure can be prepared as follows. With stirring, 100 parts by weight of glacial acetic acid, 25 parts by weight of anhydrous sodium acetate, 60 parts by weight of phthalic anhydride, and 11 parts by weight of hydroxypropyl methylcellulose (National Formulary XIII) are reacted at 80° C. for 5 hours. After the reaction, 800 parts by weight of pure water are added and the insoluble product is collected on a filter, washed well with water, and dried at 60° C. for 5 hours. The HPMCP obtained in this manner is found by assay to have 17.9% methoxyl content, 7% hydroxypropoxyl content, and 36.2% carboxybenzoyl content. Preparations of HPMCP having varying proportions of those groups are produced by using different amounts of phthalic anhydride in the above procedure.

The new capsules of the present invention are tested for their enteric properties under conditions of the human body as closely as possible. To simulate the acid conditions in the stomach, an artificial gastric juice is used having a pH of about 1.2. It contains 2.0 g. of sodium chloride and 24.0 ml. of dilute hydrochloric acid diluted with water to a total volume of 1,000 ml. The alkaline conditions of the intestine are simulated by use of an artificial intestinal juice having a pH of about 7.5. It contains 35.8 g. of disodium hydrogen phosphate and 6.0 ml. of dilute hydrochloric acid diluted with water to a total volume of 1,000 ml. Both the acid and alkaline tests are carried out at 37±2° C. and the capsule is filled with lactose or a similar material to make it sink in the test solution. The new enteric capsules of the example do not come apart, dissolve, or disintegrate for 2–4 hours when subjected to the acid treatment. However, they dissolve completely in a few minutes in the alkaline solution.

We claim:

1. A pharmaceutical capsule having enteric properties and formed from a homogeneous composition comprising gelatin and an alkali metal salt of hydroxypropyl methylcellulose phthalate, the capsule having the proportion of 1.5 to 4 parts by weight of gelatin to 1 part by weight, measured as free acid form, of an alkali metal salt of hydroxypropyl methylcellulose phthalate, the hydroxypropyl methylcellulose phthalate having approximately 15–30% methoxyl content, 4–15% hydroxypropoxyl content, and 15–40% carboxybenzoyl content.

2. A pharmaceutical capsule according to Claim 1 and comprising telescopically engaged body and cap portions.

3. A pharmaceutical capsule according to Claim 1 and containing up to 5% of glycerine.

4. A pharmaceutical capsule according to Claim 1 and containing a coloring agent.

5. A pharmaceutical capsule according to Claim 1 and containing up to 5% of propylene glycol.

References Cited
UNITED STATES PATENTS

| | | | |
|---|---|---|---|
| 2,526,683 | 10/1950 | Murphy | 206—84 |
| 2,846,353 | 8/1958 | Pipher | 424—14 |
| 3,444,290 | 5/1969 | Kee-Neng Wai | 424—14 |
| 3,493,407 | 2/1970 | Greminger et al. | 206—84 |

ALLAN LIEBERMAN, Primary Examiner

U.S. Cl. X.R.

206—84; 424—14, 16